United States Patent
Keller

[11] Patent Number: 6,146,565
[45] Date of Patent: Nov. 14, 2000

[54] METHOD OF FORMING A HEAT EXPANDABLE ACOUSTIC BAFFLE

[75] Inventor: Frederick P. Keller, Grand Rapids, Mich.

[73] Assignee: Noble Polymers, L.L.C., Grand Rapids, Mich.

[21] Appl. No.: 09/116,131

[22] Filed: Jul. 15, 1998

[51] Int. Cl.[7] .............................. B29C 44/06; B29C 44/12
[52] U.S. Cl. .................... 264/46.5; 29/522.1; 264/46.6; 264/54; 264/252; 264/255
[58] Field of Search .................................. 264/255, 46.4, 264/46.6, 46.5, 54, 252; 29/522.1

[56] References Cited

U.S. PATENT DOCUMENTS

| | | |
|---|---|---|
| 4,157,883 | 6/1979 | Mares . |
| 4,444,711 | 4/1984 | Schad . |
| 4,460,534 | 7/1984 | Boehm et al. . |
| 4,468,367 | 8/1984 | Beune et al. ........................ 264/255 |
| 4,898,630 | 2/1990 | Kitoh et al. ........................ 264/55 |
| 5,008,060 | 4/1991 | Kanai et al. ........................ 264/255 |
| 5,040,803 | 8/1991 | Cieslik et al. ........................ 264/46.6 |
| 5,160,465 | 11/1992 | Soderberg . |
| 5,212,208 | 5/1993 | Soderberg . |
| 5,266,133 | 11/1993 | Hanley et al. . |
| 5,373,027 | 12/1994 | Hanley et al. . |
| 5,506,025 | 4/1996 | Otto et al. . |
| 5,631,027 | 5/1997 | Takabatake . |
| 5,642,914 | 7/1997 | Takabatake . |
| 5,658,509 | 8/1997 | Sawyer et al. ........................ 264/46.4 |
| 5,866,052 | 2/1999 | Muramatsu ........................ 264/46.4 |

FOREIGN PATENT DOCUMENTS

| | | |
|---|---|---|
| 0 730 999 A1 | 11/1996 | European Pat. Off. . |
| WO 97/02967 | 1/1997 | WIPO . |
| WO 98/36944 | 8/1998 | WIPO . |
| WO 99/37506 | 7/1999 | WIPO . |

OTHER PUBLICATIONS

David J. Otto and John L. Hanley, "From Art to Science: A New Acoustic Baffle Material," May 1995, pp. 97–101, reprinted from Proceedings of the 1995 Noise and Vibration Conference.

*Primary Examiner*—Allan R. Kuhns
*Attorney, Agent, or Firm*—Rader, Fishman, Grauer & Mc Garry, an Office of Rader, Fishman & Grauer PLLC

[57] ABSTRACT

A lightweight expandable baffle for sealing a cavity of a vehicle body at a predetermined cross section of the cavity defined by cavity walls includes a rigid support plate having an outer periphery with a shape generally corresponding to but smaller than the shape of the cross section of the cavity, a heat expandable sealing material mounted only to the outer periphery of the rigid support plate and having an activation temperature range at which the material expands, the support plate being formed of a material having a higher melting point than the activation temperature range, and the sealing material, when activated, expands radially from the rigid support plate to fill the cross-sectional cavity between the rigid support plate and the cavity wall.

19 Claims, 2 Drawing Sheets

METHOD OF FORMING A HEAT EXPANDABLE ACOUSTIC BAFFLE

BACKGROUND OF THE INVENTION

1. Field of the Invention

This invention relates to an acoustic baffle for an automobile cavity. In one of its aspects, the invention relates to a composite integral baffle which includes a heat expandable sealing material and rigid support of predetermined shape that can be mounted in a cavity such as a hollow pillar of an automobile or similar vehicle. In another of its aspects, the invention relates to a method for manufacturing the composite integral baffle that includes a heat expandable sealing material and rigid support of predetermined shape.

2. Description of the Related Art

With increased focus on interior "noise quality" for automobiles, many new and existing material applications are being investigated. One existing application is the use of heat reactive, expanding sealing materials used in the vehicle body structures known as pillars. One particular problem to the acoustical engineer is the nuisance noise the "pillars", or hollow channels in the vehicle body structures, transmit to the passenger compartment. The pillars are linked together to define the body structure from front to back of the automobile. Blocking these channels and the noise path has proven to help a vehicle's perceived sound quality.

The nuisance noise that occurs in these pillars is related to power train, wind, tire, and road noise. Over the years, various solutions have been used to minimize the energy level of noise that flows from these sources to these pillars. A current approach is to block the path of noise with heat reactive, expandable sealing materials mounted to support plates to create a "baffle". Baffles are strategically located within the body structure in a pattern that helps to eliminate propagation of noise into the vehicle passenger compartment.

The varying vehicle body styles in the automotive industry has lead to the development of numerous baffle constructions, particularly since pillar definition is becoming more complex. This complexity has required designs to become more precise, yet flexible for easy installation. Further, because sealing effectiveness of any baffle design is critical to acoustic performance, the presence of any holes in the sealed out perimeter of the baffle within the channel drastically reduces the acoustic response.

Many attempts have been made to seal these cavities, including spraying of a sealant into the cavity, introducing foreign products into the cavity, and using fiberglass matting and the like. These past efforts have not been entirely satisfactory because of the inefficiency of the sealing and baffling methods, the relatively high cost of the sealing process, and the fact that erratic sealing has resulted in many instances.

Foaming in place has not been totally satisfactory because of the difficulty in controlling where the foam travels upon introduction of the foam into a vehicle body cavity, and the fact that more foam than is actually needed is usually introduced into the body cavity to provide some degree of redundancy in preventing the passage of moisture into and the blockage of noise within the cavity during use of the vehicle. Furthermore, foams have a finite life insofar as they become rigid with time, thus limiting the time period available in which the foam may be introduced in the vehicle cavity. In addition, if the interior surface of the cavity has a somewhat oily surface, the foams would not adequately adhere to that surface, thereby resulting in an ineffective seal.

It is also known to use an expandable baffle for sealing the cavity of an automobile pillar with a sheet of heat expandable sealing material mounted on a rigid plastic or metal support that is formed in the shape corresponding to the shape of the cross-section of the cavity to be sealed. The heat expandable material has been mounted to a single support sheet of has been sandwiched between two rigid support sheets. The composite material is mounted inside the cavity and the sealing material is expanded when the automobile is subjected to a high temperature, often during the paint baking cycle, at which point the sealing material expands to seal the cavity at the cross-section. This method generally produces a superior acoustic seal, but the manufacture of the combined heat activated sealing material and support plate is costly. In the case of the use of a single support sheet, the heat expandable material tends to form a dome shape while the sealing occurs only at the edges of the dome. Much heat expandable material is wasted. In the case of the use of a sandwich construction, the expansion tends to be directional but there is significant excess material between the two support sheets. Thus, there is much wasted sealing material. Furthermore, depending upon the dimensions of the cross-section or space restrictions for mounting the expandable material and support plate, it may not be possible to seal a pillar cavity at the preferred point. That is, the direction of expansion cannot be controlled.

SUMMARY OF THE INVENTION

According to the invention, a lightweight expandable baffle for sealing a cavity of a vehicle body at a predetermined cross section of the cavity defined by cavity walls comprising a rigid support plate having an outer periphery with a shape generally corresponding to but smaller than the shape of the cross section of the cavity and a heat expandable sealing material mounted to the outer periphery of the rigid support plate. The rigid support plate is formed of a material having a melting point above an activation temperature range and the sealing material is adapted to expand at a temperature above within the activation temperature range. The sealing material, when activated, is adapted to expand radially from the rigid support plate to fill the cross-sectional cavity between the rigid support plate and the cavity wall. Preferably, the sealing material is mounted only to the outer periphery of the rigid support plate and is integrally molded to the outer periphery of the rigid support plate. The sealing material is adhesively secured to the rigid support plate during the process of integrally molding the sealing material to the rigid support plate and/or during the process of heating the sealing material into the activation temperature range.

In one embodiment, the rigid support plate outer periphery includes a radial groove in which the sealing material is received. In another embodiment, the rigid support plate outer periphery includes a radial flange to which the sealing material is mounted. In yet another embodiment, the rigid support plate outer periphery includes an upstanding flange for directing the radial expansion of the sealing material. Preferably, the sealing material has an activation temperature range lower than 200° C. Further, the rigid support plate includes a fastener for securing the rigid support plate to one of the cavity walls. Typically, the rigid support plate is relatively thin in transverse cross section compared to a peripheral dimension.

Further according to the invention, a process for sealing a cavity of a vehicle body at a predetermined cross section of the cavity defined by cavity walls comprising the steps of forming a rigid support plate with a material which has a melting point above an activation temperature range and with an outer periphery with a shape generally corresponding to but smaller than the shape of the cross section of the cavity and mounting a heat expandable sealing material to the outer periphery of the rigid support plate. The heat expandable sealing material is adapted to expand in the activation temperature range and is preferably mounted only to the outer periphery of the rigid support plate. Further, the heat expandable sealing material is preferably integrally molded, and most preferably injection molded, to the outer periphery of the rigid support plate. The rigid support plate is mounted to the cavity walls in a generally transverse orientation thereto, leaving a small peripheral space between at least a portion of the sealing material and the cavity walls. The sealing material is heated into the activation temperature range and the sealing material is expanded radially from the outer periphery of the rigid support plate to fill the peripheral space between the sealing material and the cavity walls. The sealing material is adhesively secured to the rigid support plate during the step of integrally molding the sealing material to the rigid support plate and/or during the step of heating the sealing material into the activation temperature range.

Preferably, the forming step comprises injection molding. Further, the integrally molding steps for the rigid plate and the sealing material are performed in two sequential molding steps. In one embodiment, the forming step comprises forming a radial groove in the outer periphery of the rigid plate and the mounting step includes molding the sealing material within the radial groove in the rigid support plate. In another embodiment, the forming step comprises forming a radial flange on the outer periphery of the rigid plate and the mounting step includes molding the sealing material to the radial flange on the rigid support plate. Further, the step of expanding the sealing material radially to fill the peripheral space between the sealing material and the cavity walls is directed in part by the radial flange. Preferably, the heating step includes heating the sealing material to a temperature lower than 200° C.

BRIEF DESCRIPTION OF THE DRAWINGS

The invention will now be described with reference to the drawings in which.

DETAILED DESCRIPTION OF THE PREFERRED EMBODIMENTS

Figure 1:
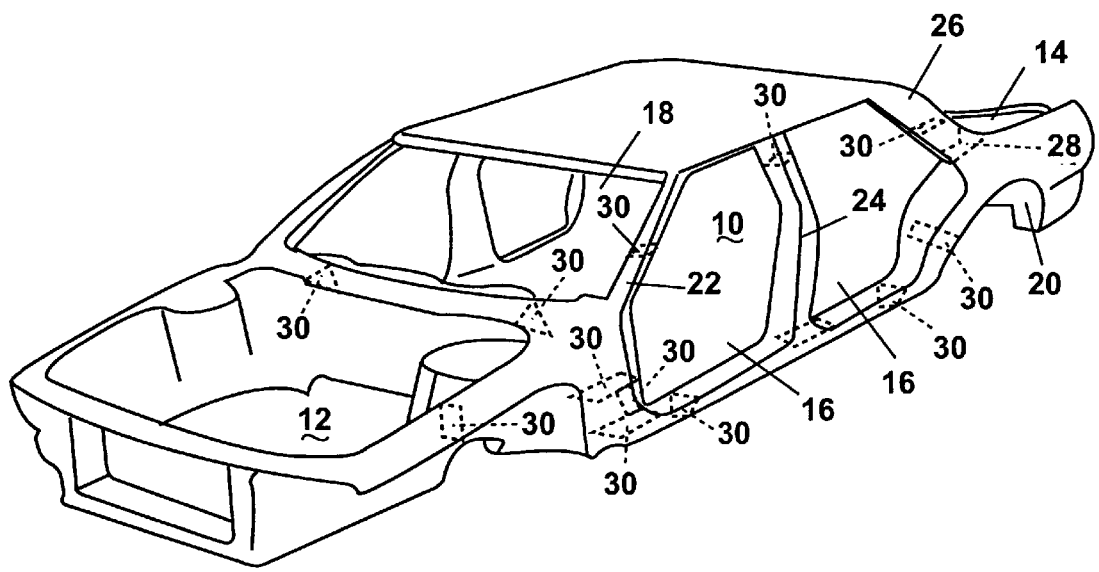
FIG. 1 is a perspective view of an automobile body frame.

An automobile body is illustrated in FIG. 1, and includes several interconnected, hollow frame elements or pillars that define a passenger compartment 10, engine compartment 12, trunk 14, doorway 16, windows 18, and wheel wells 20.

It is conventional to refer to the pillars by letter with the front side pillars 22 being the "A" pillars, the middle side pillars 24 being the "B" pillars, the rear side pillars 26 being the "C" pillars, etc. working backward on the body structure. For the purpose of simplifying the description of the invention, all pillars will be referenced generally as pillars 28.

Each pillar 28 includes a cavity 34. Examples of locations within the cavities 34 of the pillars 28 at which sealing may be desired are shown by dotted line 30. These locations include both horizontal and vertical cavities and may be located at the lower or upper end of the pillars 28, as well as anywhere in between.

Figure 2:
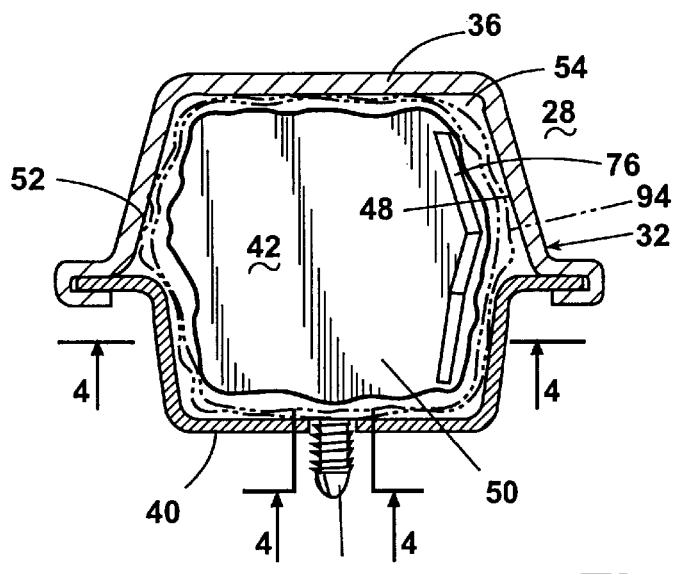
FIG. 2 is a sectional view of a pillar cavity having a composite baffle according to the invention mounted therein.

A typical pillar has a cross-section as shown in FIG. 2, which includes exterior walls 32 defining the cavity 34. With further reference to FIG. 2, the walls 32 comprise a first pillar half 36 and a second pillar half 40, which are secured to one another by welding in the course of assembly. Prior to assembly, a composite baffle 42 is secured by a flange 44 (as shown in FIGS. 3 and 4) to the first pillar half 36 or second pillar half 40 (which is shown in FIG. 2) by a fastener 46 so that after assembly the composite baffle 42 is clear of all surrounding internal walls 48.

Figure 3:
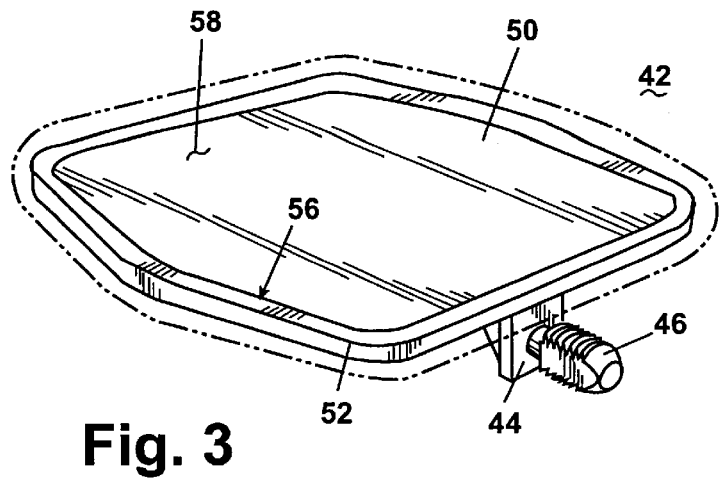
FIG. 3 is a perspective view of a composite baffle according to a first embodiment of the invention prior to installation into an automobile cavity.
Figure 4:
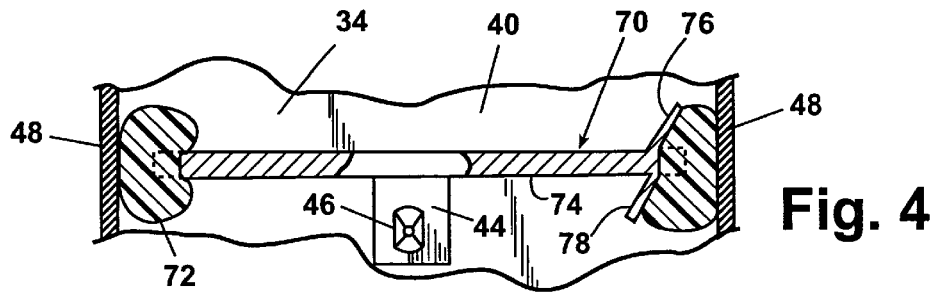
FIG. 4 is a partial sectional view of the composite baffle within a pillar cavity along line 4—4 of FIG. 2.

The composite baffle 42, as shown in perspective in FIG. 3, is used for sealing the cavity 34 of the pillar 28, and broadly includes a rigid support plate 50 and a peripheral sealing material 52. The support plate 50 is connected to the first or second pillar half 36, 40 by the flange 44 and fastener 46 as explained above. Preferably, the flange 44 and the fastener 46 are integrally molded with the support plate 50. The sealing material 52 extends around the entire periphery of the support plate 50 and can be adhered to a support plate in a variety of ways, as will be discussed more fully below. As shown in FIG. 3, the periphery of the support plate 50 is formed by a narrow outer edge 56 about a wider face 58 of the support plate 50. As shown in FIG. 2, the periphery is noted in phantom through the expanded sealing material.

The sealing material 52 is adapted to seal a predetermined vertical cross-section of the pillar cavity 34, which has a generally rectangular shape. Thus, the support plate 50 and sealing material 52 are formed of a corresponding shape, but of a size slightly smaller than that of the cross-section of the cavity 34. This construction permits drainage between the baffle and the interior surfaces of the pillar during and after any plating operations. The sealing material 52 extends peripherally about the support plate 50 and expands radially from the periphery of the support plate 50 to seal against the internal surfaces of wall 48 of the pillar 28 upon heating into an activation temperature range of the material during heating of the vehicle body during a normal paint drying operation. The expansion is shown best in FIG. 2 and in phantom in FIG. 3. This designed space between the external surface of the sealing material 52 and the internal surface of wall 48 provides a passage for fluid drainage during the washing, preparation, and priming process that a vehicle body encounters during assembly.

The sealing material 52 is preferably injection moldable and can include any expandable sealer, such as ethylene vinyl acetate, ethylene propylene diene mononer, butyl rubber, styrene butadiene rubber, or any other ethylene copolymers and terpolymers. The heat expandable sealing material 52 may also include a tackifying resin, filler, blowing agent, curing agent, adhesion promoter, or corrosion inhibitor. Examples of the sealing material are found in U.S. Pat. No. 5,266,133 and U.S. Pat. No. 5,212,208. Preferably, the activation temperature range of the sealing material is lower than 200° C.

A preferred material for the support plate 50 is a black, heat stabilized, 33% glass-reinforced 66 nylon having a heat deflection temperature at 1.8 MPa of 240° C. and a melting point of 262° C. DuPont® markets such a material as Nylind 51 HSL BK 001. However, other similar materials may be used depending upon the desired physical characteristics and include glass filled polyester materials. In any case, the melting or softening point of the support plate 50 is above the activation temperature range of the sealing material.

The sealing material 52 is adhesively secured to the rigid support plate 50 during the process of integrally molding the sealing material 52 to the rigid support plate 50 and/or during the process of heating the sealing material into the activation temperature range.

A feature of the invention is the ability to control direction of expansion of the sealing material 52 upon heating into the activation temperature range of the blowing agent in the sealing material. Another feature of the invention is the peripheral adhesion of the sealing material 52 to the support plate 50, which is accomplished by a side-by-side injection molding process to be described below. Together, these features—the ability to control directionality of expansion and the ability to adhere the sealing material about the periphery of the support plate—reduces the amount of material required to provide an effective seal between the composite baffle 42 and the internal wall 48 of the pillar 28. Furthermore, the control of the direction of expansion and the ability to adhere the sealing material to the periphery of the support plate 50 provides consistency in the sealing process, which further reduces the amount of material necessary to seal the vehicle cavity and solves the problem of inadequate sealing prevalent in some prior art structures and processes.

As shown in FIGS. 4–7, several embodiments of composite baffles illustrate the features of the present invention. Because the particular shape of each support plate will depend upon the particular cross-section area of the particular pillar to be filled, cross-sectional views, as opposed to perspective views, are more illustrative of the features. Thus, it only need be noted that for each of the embodiments, it is preferred that the sealing material be mounted to the periphery of the support plate.

It is foreseeable, however, that a particular side of the support plate may not require sealing, or that a surface, such as face 58 in FIG. 3, may include an adhered sealing material. This structure would provide additional sound reduction on the surface of face 58, if desired, and still provide sealing material to expand outwardly from the periphery of the support plate upon heating when sealing in that particular direction—normal to the face 58—is required. This may be of particular importance when the space between the sealing material and the internal wall 48 is not sufficient to allow drainage, and the support plate includes apertures therethrough for drainage. In such a case, facing the surface with a sealing material would fill those drainage apertures with the sealing material upon heating into the activation temperature range.

With reference to FIG. 4, a composite baffle 70 according to the invention is shown within a cavity 34 defined by the internal walls 48 and including a sealing material 72 adhered to the periphery of a support plate 74. The sealing material 72 is shown expanded, with the pre-expansion state shown in phantom line 94 in FIG. 4. The right-most end as viewed in FIG. 4 includes a pair of offset flanges 76, 78, for controlling the direction of expansion of the sealing material 72 at that end. The angles of the flanges 76, 78 were arbitrarily chosen but, depending upon the particulars of the cavity to be filled, the flanges as shown are useful to control expansion of the sealing material downward and slightly rearward from that end as shown approximately by the expanded sealing material 72 of FIG. 4. That is, the flange 76 would direct the expansion of the sealing material 72 laterally from the flange 76 and not inwardly. The sealing material 72 would expand rearwardly until it struck the flange 78, at which point it would expand outwardly. All directions mentioned are in reference to FIG. 4 as shown.

Figure 5:
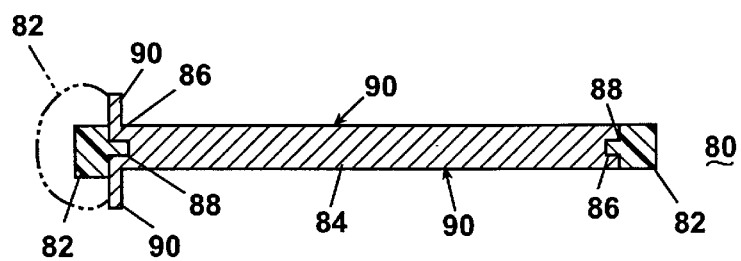
FIG. 5 is a sectional view of an alternative embodiment of a composite baffle according to the invention.

Another embodiment, a composite baffle 80, is shown in FIG. 5. As with the previous embodiments, the composite baffle 80 includes a sealing material 82 surrounding the periphery of and adhering to a support plate 84. Further to this embodiment, the support plate 84 includes a radial groove 86 about its periphery for receiving a portion 88 of the sealing material 82. The radial groove 86 increases the available surface area along the periphery of the support plate 84 available for bonding to the sealing material 82. Thus, for this embodiment, a superior bond between the sealing material 82 and support plate 84 is achieved. As shown, by using side-by-side injection molding as will be discussed below, it is relatively simple and efficient to mold composite baffles 80 in this form.

Furthermore, the support plate 84 of the composite baffle 80 includes a pair of flanges 90 set at right angles relative faces 92 of the support plate 84. These flanges 90 control the direction of expansion of the sealing material 82 outward from the support plate 84 and, more particularly, away from the faces 92 of the support plate 84. In FIG. 5, the sealing material 82 is shown unexpanded in solid lines. The expanded shape is represented by the phantom line in FIG. 5. The ability to control the direction of expansion improves the seal between the support plate and the internal walls 48 of the pillar 28 by focusing the expansion in the direction of the necessary seal.

Figures 6, 7:
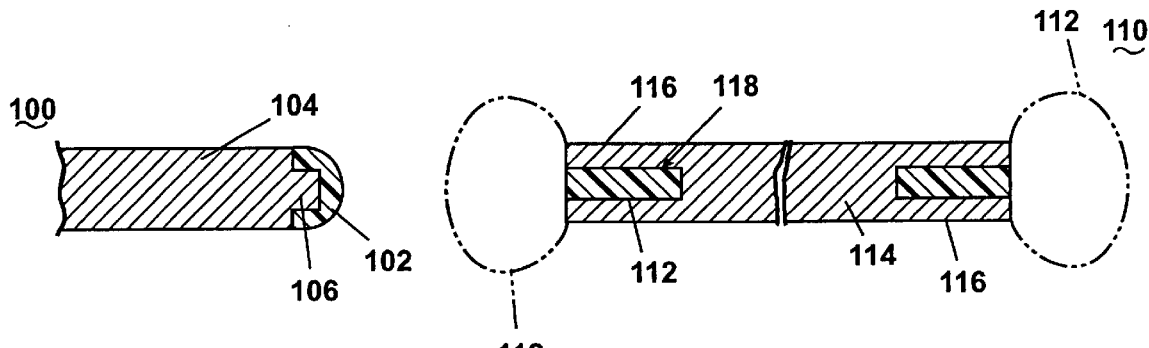
FIG. 6 is a partial sectional view of an alternative embodiment of a composite baffle according to the invention.
FIG. 7 is a partial sectional view of an alternative embodiment of a composite baffle according to the invention.

With reference to FIG. 6, a composite baffle 100 according to the invention is shown including a sealing material 102 about the periphery of a support plate 104. Furthermore, the periphery of the support plate 104 includes a radial flange 106 for increasing the surface area for attachment of the sealing material 102 to the support plate 104. Again, with the increased surface area, a better bond between the materials of the two elements is achieved.

A composite baffle 110 according to the invention is shown in FIG. 7. The composite baffle 110 includes a generally H-shaped support plate 114 defining radial grooves 118 for substantially enclosing the sealing material 112 on three sides. Thus, before activation by heat, the sealing material 112 does not extend beyond the periphery of the support plate 114. When heated, however, the sealing material 112 expands outwardly, to the form shown in phantom lines in FIG. 7, to contact the internal surface of walls 48 defining a cavity 34 of a pillar 28. The direction of expansion is controlled in part by the length of the legs 116 comprising the generally H-shaped support plate, but can further include flanges, or shorter or longer legs 116 for all or some of the legs 116, to provide greater control over expansion. Also, expansion can be controlled by the amount of sealing material provided within the radial groove 118, or even extending some of the sealing material 112 beyond the periphery of the support plate 114 so that a greater distance between the pre-expansion composite baffle 110 and the internal wall 48 of the cavity 34 can be provided.

For all of the embodiments discussed above, the support plate is adapted to support the sealing material at a predetermined location within the pillar cavity while the automobile body is subjected to the elevated temperature. Such positioning of the support plate is achieved, at least in part, by the flange 44, as shown in FIGS. 3 and 5, which can set the angle and position of the composite baffle relative to the internal walls 48. The support plate and flange 44, where appropriate, are formed of material having a melting point that is higher than both the activation temperature range of the sealing material and the bake temperature to which the automobile body is to be exposed. Preferably, the temperature at which the material of the support plate softens, is also above the bake temperature. By employing a material having this characteristic, it is possible for the support plate to substantially maintain its shape before, during, and after the baking operation, and to support the sealing material. Furthermore, preferably the support plate is formed of a moldable material that is pliable so that special handling of the composite baffle is not required and that the support plate can be subjected to bending forces without being cracked or permanently deformed.

Once the composite baffle has been positioned within the cavity 34, it remains in place until such time as the automobile body is exposed to an elevated temperature sufficient to activate the sealing material and cause the material to expand against internal walls 48 of the pillar 28. Typically, an automobile body is baked to seal the exterior paint applied to the vehicle body walls. Any of a number of process or manufacturing steps may be carried out on the automobile body prior to baking, without affecting the ability of the sealing pieces to expand when exposed to the activating temperature.

As the automobile body is baked, and the temperature of the sealing material approaches the activation temperature range, there is a tendency for the sealing material to soften and sag under the force of gravity. However, flanges, if positioned correctly, can retain in place the sealing material within the cavity 34 so that it is not allowed to sag significantly enough to reduce the ability of the sealing material to properly seal against the internal walls 48 of the pillar 28. Furthermore, because the lowermost portion of the composite baffle is resting on a horizontal bottom internal wall of the pillar 28, it is not necessary to provide a flange thereon to guide or support it—gravity itself guides it.

Once the activation temperature range of the sealing material is reached, the material begins to expand in all directions, except where the direction is changed or encouraged by the positioning of the flanges. Because the composite baffle according to the invention includes the sealing material about the periphery of the support plate, it is only necessary to provide enough sealing material to extend between the edges of the support plate and the internal walls. This reduction in material is a great advantage over the prior art, which typically faced an entire support plate with material, i.e., by die cutting the sealing material to the shape, or slightly large than the shape, of the support plate. It was only by doing this that the prior art baffles were able to achieve an adequate and consistent seal. Through flanges and providing the sealing material about he periphery of the support plate, such a waste of material is no longer necessary.

As mentioned repeatedly above, a composite baffle according to the invention can be manufactured efficiently and simply through side-by-side injection molding. This process is explained fully in U.S. Pat. No. 4,444,711 to Shad and U.S. Pat. No. 4,460,534 to Boehm, which are hereby incorporated by reference. Generally, side-by-side injection molding includes sequentially injecting different raw materials into a mold in such a way that the different materials can be injection molded into a single part directly from the injection-molding machine. In summary, the first material is injected into the mold, cooled and then by means of sliding cores in the mold, robotics, or revolving platens, a second material can be injected directly onto the first material. This process for producing composite baffles has a lower cost in that it saves assembly time and labor, it produces one part, as opposed to two, in the molding process; has a lower tooling cost than producing separate parts which must be bonded together; and provides an improved bond between the two parts.

The composite baffles according to the invention can be produced such that successive portions, such as the support plate and the sealing material, are adhesively bonded notwithstanding the fact that these adjacent sections are of different grades, properties, and/or colors of plastic material. For example, to achieve a composite baffle, adjacent spaces defined by injected mold halves cavities have a movable core plate that, in one position, blocks one portion of the cavity while a first material is being injection molded in an adjacent portion of the cavity. After the first material cools to solid form but preferably while still warm, the core plate is moved so that the one portion of the cavity is open. Then, the second material is injection molded into the open space and the second material flows into the open space to integrally bond to the first part.

Preferably, before the support reaches room temperature, the sealing material is injected into the mold to fill the mold space and also any cavities or textured surfaces provided on the support plate. After the sealing material and support plate are molded together, they are cooled and removed from the mold. The resulting composite baffle, when removed from the mold, are similar to those shown in FIGS. 4–7.

In a manner similar to that described above, a composite baffle composed of more than two different plastic materials may be obtained as will be readily apparent to those skilled in the art, keeping in mind that between each two successively adjacent spaces for different sections of the resulting composite baffle, there must be a movable core registerable with adjacent mold cavity portions to the flow of molten material therein.

The invention provides a baffle having a sealing material for which the direction of expansion can be controlled. Thus, the position of the support plate and expandable sealing material in the cavity is not so critical because the direction of expansion can be controlled, thereby sealing the cavity at the preferred cross section in the pillar. Also, a baffle uses less sealing material to achieve an effective seal.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A process for sealing an elongated cavity of a vehicle body at a predetermined cross section of the cavity defined by cavity walls, the process comprising:

forming a relatively thin rigid support plate with a material which has a melting point above an activation temperature range and having an outer periphery with a shape generally corresponding to but smaller than the shape of the predetermined cross section of the cavity;

integrally molding a heat expandable sealing material to the outer periphery of the rigid support plate, the heat expandable sealing material being adapted to expand in the activation temperature range;

mounting the rigid support plate to the cavity walls in a generally transverse orientation with respect to a longitudinal axis of the cavity and leaving a small peripheral space between the sealing material and the cavity walls;

heating the sealing material into the activation temperature range; and expanding the sealing material radially of the longitudinal axis of the cavity from the rigid support plate to fill the peripheral space between the sealing material and the cavity walls.

2. A process for sealing a cavity of a vehicle body according to claim 1 wherein the forming step comprises injection molding.

3. A process for sealing a cavity of a vehicle body according to claim 2 wherein the integrally molding steps for the rigid plate and the sealing material are performed sequentially in a two-step injection molding operation.

4. A process for sealing a cavity of a vehicle body according to claim 1 wherein the forming step comprises forming a radial groove in the outer periphery of the rigid plate and the integrally molding step includes molding the sealing material within the radial groove in the rigid support plate.

5. A process for sealing a cavity of a vehicle body according to claim 1 wherein the forming step comprises forming a radial flange on the outer periphery of the rigid plate and the integrally molding step includes molding the sealing material to the radial flange on the rigid support plate.

6. A process for sealing a cavity of a vehicle body according to claim 5 wherein the step of expanding the sealing material radially to fill the peripheral space between the sealing material and the cavity walls is directed in part by the radial flange.

7. A process for sealing a cavity of a vehicle body according to claim 1 wherein the heating step includes heating the sealing material to a temperature lower than 200° C.

8. A process for sealing a cavity of a vehicle body according to claim 1 wherein the integrally molding step comprises injection molding.

9. A process for sealing a cavity of a vehicle body according to claim 1 wherein the small peripheral space is left around substantially all of the sealing material and the cavity walls at the predetermined cross section of the elongated cavity.

10. A process for sealing an elongated cavity of a vehicle body at a predetermined cross section of the cavity defined by cavity walls, the process comprising:

forming a relatively thin rigid support plate with a material which has a melting point above an activation temperature range and having an outer periphery with a shape generally corresponding to but smaller than the shape of the predetermined cross section of the cavity;

mounting a heat expandable sealing material only to the outer periphery of the rigid support plate, the heat expandable sealing material being adapted to expand in the activation temperature range;

mounting the rigid support plate to the cavity walls in a generally transverse orientation with respect to a longitudinal axis of the cavity and leaving a small peripheral space between the sealing material and the cavity walls;

heating the sealing material into the activation temperature range; and expanding the sealing material radially of the longitudinal axis of the cavity from the rigid support plate to fill the peripheral space between the sealing material and the cavity walls.

11. A process for sealing a cavity of a vehicle body according to claim 10 wherein the heat-expandable sealing material mounting step comprises integrally molding the heat expandable sealing material to the rigid support member.

12. A process for sealing a cavity of a vehicle body according to claim 11 wherein the forming step comprises injection molding.

13. A process for sealing a cavity of a vehicle body according to claim 12 wherein the integrally molding step for the rigid plate and the integrally molding step for the sealing material are performed in two sequential injection molding steps.

14. A process for sealing a cavity of a vehicle body according to claim 10 wherein the step of forming a rigid support plate comprises forming a radial groove in the outer periphery of the rigid support plate and the heat-expandable sealing material mounting step includes molding the sealing material within the radial groove in the rigid support plate.

15. A process for sealing a cavity of a vehicle body according to claim 10 wherein the step of forming a rigid support plate comprises forming a radial flange on the outer periphery of the rigid plate and the mounting step includes molding the sealing material to the radial flange on the rigid support plate.

16. A process for sealing a cavity of a vehicle body according to claim 10 wherein the step of expanding the sealing material radially to fill the peripheral space between the sealing material and the cavity walls is directed in part by the radial flange.

17. A process for sealing a cavity of a vehicle body according to claim 10 wherein the heating step includes heating the sealing material to a temperature lower than 200° C.

18. A process for sealing a cavity of a vehicle body according to claim 10 wherein the forming step comprises injection molding.

19. A process for sealing a cavity of a vehicle body according to claim 10 wherein the small peripheral space is left around substantially all of the sealing material and the cavity walls at the predetermined cross section of the elongated cavity.

* * * * *